United States Patent
Haran et al.

(10) Patent No.: US 10,382,339 B2
(45) Date of Patent: Aug. 13, 2019

(54) LARGE SCALE BANDWIDTH MANAGEMENT OF IP FLOWS USING A HIERARCHY OF TRAFFIC SHAPING DEVICES

(71) Applicant: CITRIX SYSTEMS, INC., Fort Lauderdale, FL (US)

(72) Inventors: Jeffrey Haran, Fremont, CA (US); Ashwani Wason, San Jose, CA (US); Nicholas Stavrakos, Los Altos, CA (US); Grisha Kotlyar, Cupertino, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 13 days.

(21) Appl. No.: 15/941,162

(22) Filed: Mar. 30, 2018

(65) Prior Publication Data
US 2018/0227234 A1    Aug. 9, 2018

Related U.S. Application Data

(63) Continuation of application No. 14/595,070, filed on Jan. 12, 2015, now Pat. No. 9,967,197.

(51) Int. Cl.
*H04L 12/815* (2013.01)
*H04L 12/24* (2006.01)
*H04L 12/851* (2013.01)
*H04L 12/801* (2013.01)

(52) U.S. Cl.
CPC .......... *H04L 47/22* (2013.01); *H04L 41/5003* (2013.01); *H04L 47/2483* (2013.01); *H04L 47/35* (2013.01)

(58) Field of Classification Search
CPC ..... H04L 47/22; H04L 47/2483; H04L 47/35; H04L 47/5003
See application file for complete search history.

(56) References Cited

U.S. PATENT DOCUMENTS

| | | | |
|---|---|---|---|
| 5,121,383 A * | 6/1992 | Golestani | H04J 3/247 370/235 |
| 5,265,257 A * | 11/1993 | Simcoe | G06F 13/362 710/263 |
| 7,382,787 B1 * | 6/2008 | Barnes | H04L 12/66 370/401 |
| 7,428,239 B1 * | 9/2008 | Seigneurbieux | H04L 47/6215 370/418 |
| 7,783,739 B1 | 8/2010 | Weigle | |
| 7,856,544 B2 | 12/2010 | Schenfeld et al. | |
| 2001/0030970 A1 | 10/2001 | Wiryaman et al. | |
| 2002/0012356 A1 | 1/2002 | Li et al. | |
| 2003/0037180 A1 | 2/2003 | Madineni et al. | |
| 2003/0147403 A1 | 8/2003 | Border et al. | |

(Continued)

*Primary Examiner* — Jenee Holland
(74) *Attorney, Agent, or Firm* — Allen, Dyer, Doppelt + Gilchrist, PA

(57) ABSTRACT

A computer network appliance may include a memory and a processor cooperating with the memory to run a classification kernel module performing traffic shaping on data packets based upon a first set of queuing disciplines (qdiscs). The processor may further run at least one virtual device also performing traffic shaping on the data packets based upon a second set of qdiscs different than the first set of qdiscs, and provide the data packets to a network interface.

20 Claims, 7 Drawing Sheets

(56) References Cited

U.S. PATENT DOCUMENTS

| | | |
|---|---|---|
| 2003/0177395 A1 | 9/2003 | Pardee et al. |
| 2004/0010473 A1 | 1/2004 | Hsu et al. |
| 2005/0050221 A1* | 3/2005 | Tasman ................ H04W 52/46 709/232 |
| 2005/0060418 A1 | 3/2005 | Sorokopud |
| 2006/0117317 A1* | 6/2006 | Crawford ............... G06Q 10/02 718/104 |
| 2006/0126504 A1 | 6/2006 | Meier et al. |
| 2007/0291778 A1 | 12/2007 | Huang et al. |
| 2008/0019371 A1* | 1/2008 | Anschutz ................ H04L 47/10 370/394 |
| 2008/0084866 A1 | 4/2008 | Johnson et al. |
| 2008/0225710 A1 | 9/2008 | Raja et al. |
| 2009/0252219 A1* | 10/2009 | Chen .............. H04N 21/234327 375/240.02 |
| 2013/0191537 A1* | 7/2013 | Ivanov .............. H04L 29/12066 709/224 |
| 2014/0047079 A1* | 2/2014 | Breternitz ............. G06F 9/5072 709/220 |
| 2014/0047084 A1* | 2/2014 | Breternitz ........... H04L 67/1008 709/221 |
| 2014/0047095 A1* | 2/2014 | Breternitz ............. G06F 9/5072 709/224 |
| 2014/0047227 A1* | 2/2014 | Breternitz ............. G06F 9/5066 713/2 |
| 2014/0047272 A1* | 2/2014 | Breternitz ........... G06F 11/3495 714/32 |
| 2014/0047341 A1* | 2/2014 | Breternitz ............... G06F 9/505 715/735 |
| 2014/0047342 A1* | 2/2014 | Breternitz ............. G06F 9/5061 715/735 |
| 2014/0219287 A1* | 8/2014 | Birke .................... H04L 47/621 370/412 |

* cited by examiner

LARGE SCALE BANDWIDTH MANAGEMENT OF IP FLOWS USING A HIERARCHY OF TRAFFIC SHAPING DEVICES

RELATED APPLICATIONS

This application is a continuation of application Ser. No. 14/595,070 filed Jan. 12, 2015, which is hereby incorporated herein in its entirety by reference.

BACKGROUND

Traffic shaping is a computer network traffic management technique for delaying some or all packets (also referred to as "datagrams," or "data packets") to bring the packets into compliance with a desired traffic control policy. Traffic shaping is used to optimize or guarantee performance, improve latency, and/or increase usable bandwidth for some types of packets by delaying the distribution of other packets. Traffic shaping often categorizes traffic into different classes such that one type of traffic can be transmitted before or after another type of traffic.

The Linux operating system offers a rich set of tools for managing and manipulating the transmission of packets. Linux includes a feature known as "traffic control," which enables Internet traffic to be classified by various criteria. This traffic control system has matured under more recent versions of the Linux kernel. After a packet is classified, it can be queued to software entities known as queuing disciplines, or "qdiscs," that cause packets to be transmitted at no more than a given rate. Qdiscs cause traffic to be queued, and by using "classful qdiscs," packets can be prioritized with respect to other packets. Further, in some cases, network bandwidth can be guaranteed to packets belonging to specific classes.

One problem with the standard Linux traffic control system is that the handles used to identify qdiscs can only be referenced by a set of hexadecimal digits between 1 and ffff (i.e., 64K−1, which for purposes of brevity will be referred to as 64K herein). Thus, the number of qdiscs that can be assigned to a given network device is limited to 64K. As the number of client devices, such as mobile phones, and the amount of traffic being sent everyday over networks increases, only being able to access 64K qdiscs can become problematic. Thus, an alternative approach is needed in the art.

SUMMARY

A computer network appliance may include a memory and a processor cooperating with the memory to run a classification kernel module performing traffic shaping on data packets based upon a first set of queuing disciplines (qdiscs). The processor may further run at least one virtual device also performing traffic shaping on the data packets based upon a second set of qdiscs different than the first set of qdiscs, and providing the data packets to a network interface.

More particularly, the classification kernel module may further determine at least one traffic shaping rule associated with different data packets, and the at least one virtual device may select respective qdiscs from among the second set of qdiscs for different data packets based upon the at least one traffic shaping rule determined by the classification kernel module. The at least one traffic shaping rule may comprise at least one of a subscriber traffic shaping rule and an application traffic shaping rule, for example.

In an example implementation, the at least one virtual device may include at least one virtual subscriber device to perform traffic shaping based upon respective subscribers associated with the data packets. More particularly, the at least one virtual subscriber devices may comprise a plurality of virtual subscriber device, and the processor may further run a virtual subscriber multiplexer (mux) device for distributing the data packets from the classification kernel module to the plurality of virtual subscriber devices, for example.

In accordance with another example implementation, the at least one virtual device may comprise a virtual application device to perform traffic shaping based upon a data type associated with the data packets from among a plurality of different data types. The network interface may comprise a wireless virtual local area network (VLAN) and an Internet VLAN, for example, and the processor may further run a virtual wireless head to receive data packets from the classification kernel module designated for the wireless VLAN device, and an Internet head to receive data packets from the classification kernel designated for the Internet VLAN. More specifically, the processor may further run a VLAN multiplexer (mux) to route data packets to the wireless VLAN or Internet VLAN based upon the virtual wireless head and the virtual Internet head, for example.

A related computer network traffic shaping method may include performing traffic shaping on data packets at a classification kernel module based upon a first set of qdiscs, and performing traffic shaping on the data packets also using at least one virtual device based upon a second set of qdiscs different than the first set of qdiscs. The method may further include providing the data packets to a network interface after shaping based upon the first and second sets of qdiscs.

A related non-transitory computer-readable medium is for a computer network appliance running a classification kernel module and at least one virtual device. The non-transitory computer-readable medium may have computer-executable instructions for causing the computer network appliance to perform steps including performing traffic shaping on data packets at the classification kernel module based upon a first set of qdiscs, performing traffic shaping on the data packets also using the at least one virtual device based upon a second set of qdiscs different than the first set of qdiscs, and providing the data packets to a network interface after shaping based upon the first and second sets of qdiscs.

DETAILED DESCRIPTION

Figure 1A:
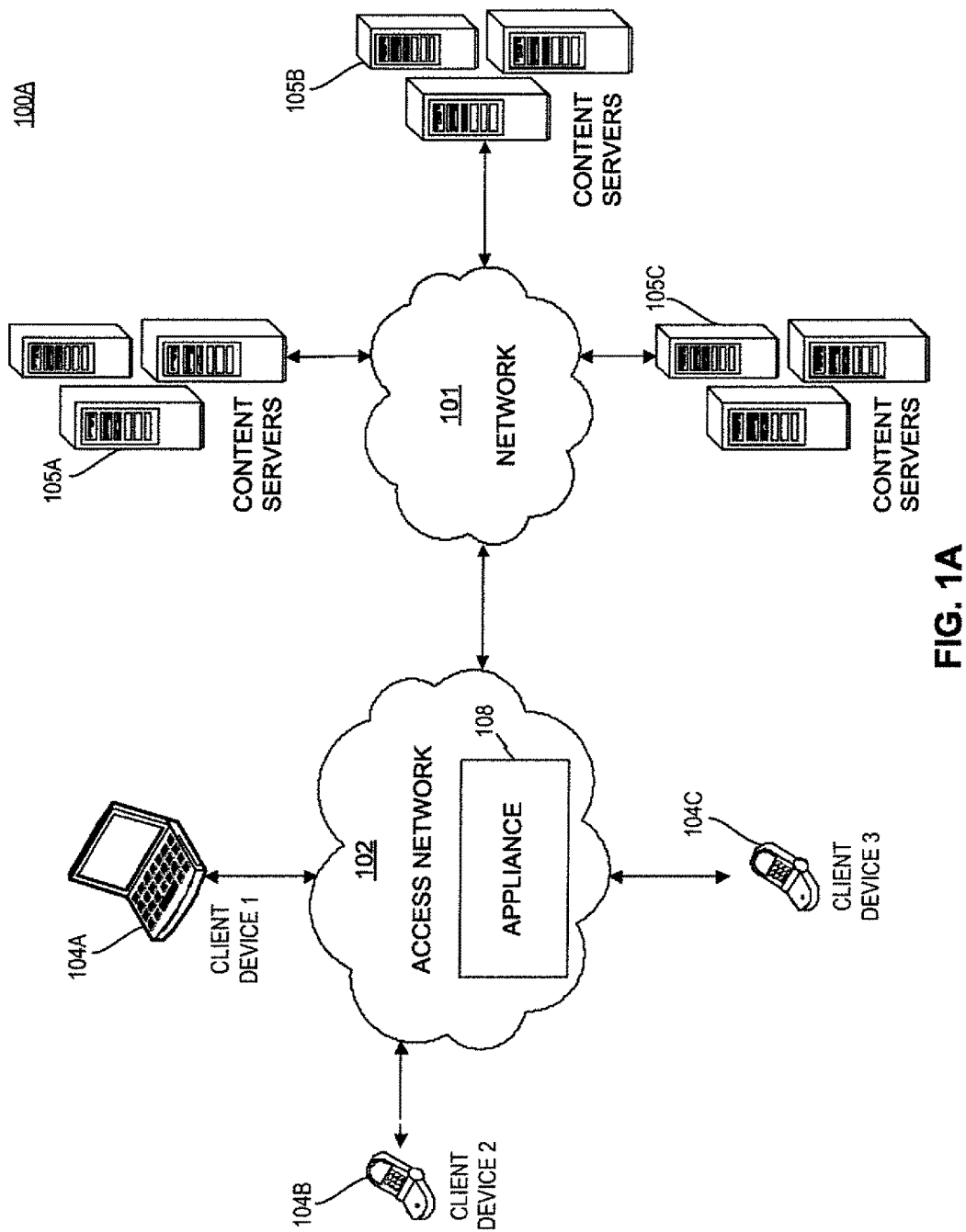
FIGS. 1A-1B are block diagrams of an example network environments, consistent with embodiments described herein.

Reference will now be made in detail to the example embodiments which are illustrated in the accompanying drawings. Wherever possible, the same reference numbers will be used throughout the drawings to refer to the same or like parts. Further, the terms "transmit" and "provide" are used throughout the present disclosure and claims. It should be appreciated that unless otherwise specified herein, the terms may be used to indicate the direct transfer or availability of data (e.g., a packet) to another device, or the indirect transfer or availability of data to another device. For instance, if a client device transmitted or provided a packet to a server, then (1) that client device could have transmitted or provided that packet directly to that server, or (2) that client device could have transmitted or provided that packet to one or more intervening devices, such that the packet is received by the server after being transmitted or provided to the one or more devices.

As described above, one limitation facing the Linux traffic controls is the limited number of qdiscs or classes available. The 64K limitation can be burdensome when, for instance, a large number of devices use a particular traffic control platform and a service provider wishes to manage many classes of traffic.

Embodiments presented herein are intended to circumvent the 64K qdisc limitation via the addition of network devices (e.g., virtual devices) that serve as additional containers for qdiscs while causing the packets queued in those network devices to be transmitted out of the same set of physical (or virtual) network devices. For example, additional devices can be added to the traditional Linux kernel in order to increase the capacity for qdiscs within the Linux kernel.

Embodiments disclosed herein enable one or more packets to be subject to multiple layers of classification and shaping, all of which can be useful when the goal of traffic shaping is to limit bandwidth based on multiple, independent criteria. For instance, packets can be subjected to traffic control based on a combination of criteria including subscriber data and/or application data. Herein, subscriber data can refer to quantifiable characteristics associated with receiving or accessing packets including, but not limited to: bandwidth available to an entity (e.g., a user, corporation, etc.), bandwidth paid for by an entity, a device providing a network link, a particular port or a set of ports being used to transmit data, a location from which packets are received from, a location to where packets are sent, bandwidth associated with a subnet in which traffic is received, etc. For instance, example subscriber data can be a subscription plan, where a "gold" subscriber pays $100 for their subscription that allows for network speeds of 100 megabits per second (Mbps), a "platinum" subscriber pays $200 for their subscription that allows for network speeds of 400 Mbps, etc. Application data can include data that is associated with, but is not limited to: a type of application that receives or transmits packets (e.g., BitTorrent applications, video conferencing applications, Voice Over IP (Internet Protocol) applications, video games, File Transfer Protocol applications, etc.), a particular website or type of website, a file or type of file (e.g., .rar, .gz, .pk4, etc.), etc. It should be appreciated that while distinctions are made between subscriber data and application data, in some embodiments overlap can exist between subscriber data and application data. In other words, in some instances, a particular criterion can be classified as both subscriber data and application data.

Moreover, various embodiments described herein enable traffic to be controlled by the configuration of an Internet Protocol (IP) stack above a classification module that can select head devices. Packets can be sent to a given head device as transmitted from a given virtual local area network (VLAN) device. In various embodiments described herein, the aggregate flow of packets amongst all such devices can be controlled—as opposed to controlling traffic on a per device basis.

As discussed above, classful queuing allows packets to be prioritized with respect to other packets. One type of classful queuing that has gained popularity amongst Linux developers is the Hierarchical Token Bucket (HTB) qdisc. An HTB qdisc can have a guaranteed bandwidth as well as a maximum bandwidth. Another type of classful queuing is Class Based Queuing (CBQ). CBQ qdiscs are widely used, and can be implemented in some embodiments described herein.

FIG. 1A is a block diagram of an example network environment 100A. Example network environment 100A (and 100B of FIG. 1B) can be any type of system that transmits data packets over a network. For example, network environment 100A can include one or more networks transmitting data packets across wired or wireless networks from servers to communication devices. Network environment 100A can include, among other things, a network 101, an access network 102, an appliance 108, one or more communication devices 104A-C (collectively as communication device 104), and one or more servers 105A-C (collectively as server 105).

Network 101 can include any combination of wide area networks (WANs), local area networks (LANs), or wireless networks suitable for packet-type communications. In some example embodiments, network 101 can be, for example, Internet and X.25 networks. Network 101 can communicate data packets with access network 102 and with one or more servers 105A-C.

Access network 102 can include one or more radio networks, one or more cellular networks, one or more wide area networks (WANs), one or more local area networks (LANs), wireless networks suitable for packet-type communications, or any combination thereof. Access network 102 can be operated by, for example, service providers such as DSL service provides (e.g., AT&T®), broadband service providers (e.g., Comcast®), and numerous cellular service provides (e.g., AT&T®, Sprint®, and Verizon®). Access network 102 can employ technologies including digital subscriber line (DSL), cable broadband, 802.11 Wi-Fi, Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). For example, in some embodiments, access network 102 can be a General Packet Radio Service (CPRS) core network, which provides mobility management, session management and transport for Internet Protocol packet services in GSM and W-CDMA networks. One or more communication devices (e.g., 104A-C) can communicate with access network 102, which in turn communicates with one or more servers 105A-C directly or indirectly through network 101. An example network 102 can include, among other things, multimedia optimization system 103.

Appliance 108 is a physical device and/or is software that optimizes wide area network (WAN) traffic by including, for example, a quality of service (QoS) engine. In various embodiments described herein, devices can be instantiated and/or utilized by appliance 108. In some embodiments, appliance 108 may be implemented in an access network 102, or network 101. Further, as will be described below, in some embodiments access network 102 and network 101 can be part of a public network 107 (of FIG. 1B). As shown in FIG. 1A, appliance 108 can be deployed at one or more locations within access network 102. Appliance 108, however, is not limited to be located within the access network 102. Rather, it can be implemented at any intermediate nodes within the network environment 100A. In some embodiments of access network 102, appliance 108 can be incorporated in a gateway node that has visibility into data traffic between all communication devices and servers. For example, in the case of a mobile broadband access network using GSM or UMTS technology, appliance 108 can be located at any intermediate nodes including Traffic Optimization Platforms (TOP), Deep Packet Inspection (DPI) nodes, and other gateway nodes such as the Gateway GPRS Support Node (GGSN). A TOP can perform web and video compression. A DPI node can examine the header (and possibly also the data part) of a packet as it passes an inspection point, searching for protocol non-compliance, viruses, spam, intrusions, or defined criteria to decide whether the packet may pass or if it needs to be routed to a different destination, or, for the purpose of collecting statistical information. A GGSN can be responsible for the interworking between the GPRS network and external packet switched networks, such as the Internet and X.25 networks.

One or more communication devices 104A-C can be devices or applications, either in hardware or software, that communicate with access network 102. One or more communication devices 104A-C can be, for example, mobile handheld devices, laptop computers, netbook devices, smart phone devices, tablets, web TV equipment, gaming devices such as Microsoft Xbox® series devices, Nintendo Wii™ series devices, and Sony PlayStation® series devices, or any other devices or applications that can communicate with a network. While it is appreciated that one or more communication devices 104A-C can include wired devices, one or more communication devices 104A-C are typically wireless devices since the experience for users of wireless devices tends to fluctuate more based on the variation in one or more networks bandwidths and the number of subscribers using those networks. One or more communication devices 104A-C can make requests to and receive responses from one or more servers 105A-C through access network 102 and network 101.

One or more servers 105A-C can be any computer systems or software programs that are capable of serving the requests of clients, e.g., one or more communication devices 104A-C. One or more servers 105A-C can be any types of servers including multimedia servers, application servers, communication servers, database servers, proxy servers, web servers, caching servers, and any other suitable servers. One or more servers 105A-C can store and provide, among other things, multimedia data. Any requested multimedia data can be provided by one or more servers 105A-C. One or more servers 105A-C can communicate with one or more communication devices 104 through network 101 and access network 102.

Figure 1B:
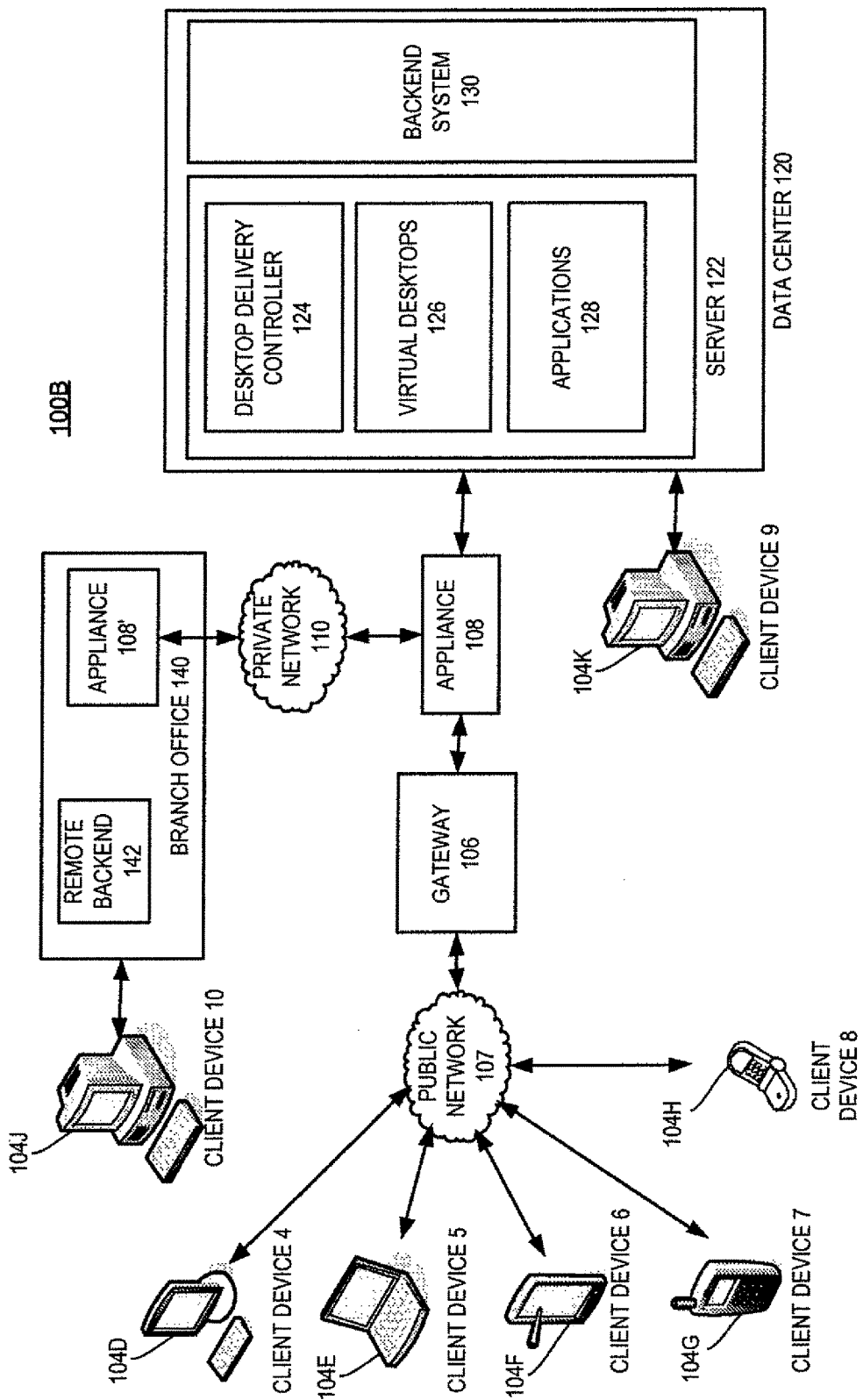

FIG. 1B is a block diagram of an example network environment 100B. It should be appreciated that network environment 100B can contain some, all, or none of the elements included in network environment 100A. It should also be appreciated that some elements in network environment 100B may correspond to elements in network environment 100A. For example, appliance 108 in FIG. IA can correspond with appliance 108 in FIG. 1B. It should be apparent to one skilled in the art which elements (e.g., appliances, network devices, client devices, etc.) of one network environment 100A or 100B can correspond to one or more elements in the other network environment 100A or 100B. Moreover, network environment 100B, as well as network environment 100A, in some embodiments, can contain elements which can be used to implement various systems and methods described herein. While example network environment 100B is directed to a virtual network environment, it is appreciated that network environment 100B can be any type of network that communicates using packets. Network environment 100B can include one or more client devices 104, a public network 107, a gateway 106, an appliance (e.g., 108 or 108'), a private network 110, a data center 120, and a branch office 140.

One or more client devices 104 are devices that can acquire remote services from data center 120 through various means. Client devices 104 can communicate with data center 120 either directly (e.g., client device 104K) or indirectly through a public network 107 (e.g., client devices 104D-H) or a private network 110 (e.g., client device 104J). As with the client devices described in network environment 100A above, while client devices 104 are portrayed as a computer (e.g., client devices 104A, 104K, and 104J), a laptop (e.g., client device 104E), a tablet (e.g., client device 104F), a mobile smart phone (e.g., client device 104G), and a mobile phone (e.g., client device 104H). It is appreciated that client device 104 could be any type of device that can send and receive packets to and from data center 120, such as a wearable computer and/or a smartwatch.

Gateway 106 is a physical device and/or is software that is part of a physical device that interfaces between two networks having different protocols. Gateway 106, for example, can be a router or other network device. In some embodiments, gateway 106 can include or be coupled to a firewall separating gateway 106 from public network 107 (e.g., Internet). Gateway 106 has the ability to modify signals received from client device 104 into signals that appliance 108 and/or data center 120 can understand and vice versa.

As described above, appliance 108 is a physical device and/or is software that optimizes wide area network (WAN) traffic by including, for example, a quality of service (QoS) engine. In various embodiments described herein, devices can be instantiated and/or utilized by appliance 108. Further, in some embodiments, an appliance 108 can be placed between client devices 104 and a public network 107 (e.g., the Internet). In some embodiments, public network 107 can include access network 102 and network 101 of network environment 100A, and thus also include appliance 108. Routers, load balancers, and other devices can be communicatively coupled with client devices 104, appliances 108, and/or public network 107. In some embodiments, appliance 108 can be placed between an access network (not shown) and public network 107. In some embodiments, appliance 108 optimizes other types of network traffic, such as local area network (LAN) traffic or metropolitan area network (MAN) traffic. In an example embodiment, appliances 108 and 108' optimize Wide Area Network (WAN) network traffic data. In some embodiments, appliance 108 can be a virtual appliance. In some embodiments, a first appliance (e.g., appliance 108) works in conjunction with or in cooperation with a second appliance (e.g., appliance 108') to optimize network traffic. For example, the first appliance can be located between the WAN and a corporate local area network (LAN; e.g., data center 120), while the second appliance can be located between a remote backend system 142 within the branch office (e.g., branch office 140) and a WAN connection. In some embodiments, the functionality of gateway 106 and appliance 108 can be located in a single physical device. Appliance 108 is further described below.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity that can correspond with and/or be represented by any electronic addressable format, and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 104D-K or branch office 140). For example, applications 128 can include Windows™-based applications and computing resources.

In some embodiments, the services include providing one or more virtual desktops 126 that can provide one or more applications 128. Virtual desktops 126 can include hosted shared desktops allowing multiple users to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 120. For example, backend system 130 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 104 or branch office 140.

Branch office 140 is part of a local area network that is part of the WAN having data center 120. Branch office 140 can include, among other things, appliance 108' and remote backend 142. In some embodiments, appliance 108' can sit between branch office 140 and private network 110. Remote backend 142 can be set up in similar manner as backend system 130 of data center 120. Client device 104W can be located on-site to branch office 140 or can be located remotely from branch office 140. Appliances 108 and 108' and gateway 106 can be deployed as is, or executed on any type and form of computing device, including any computer or networking device capable of communicating on any type and form of network described herein.

Figure 2A:
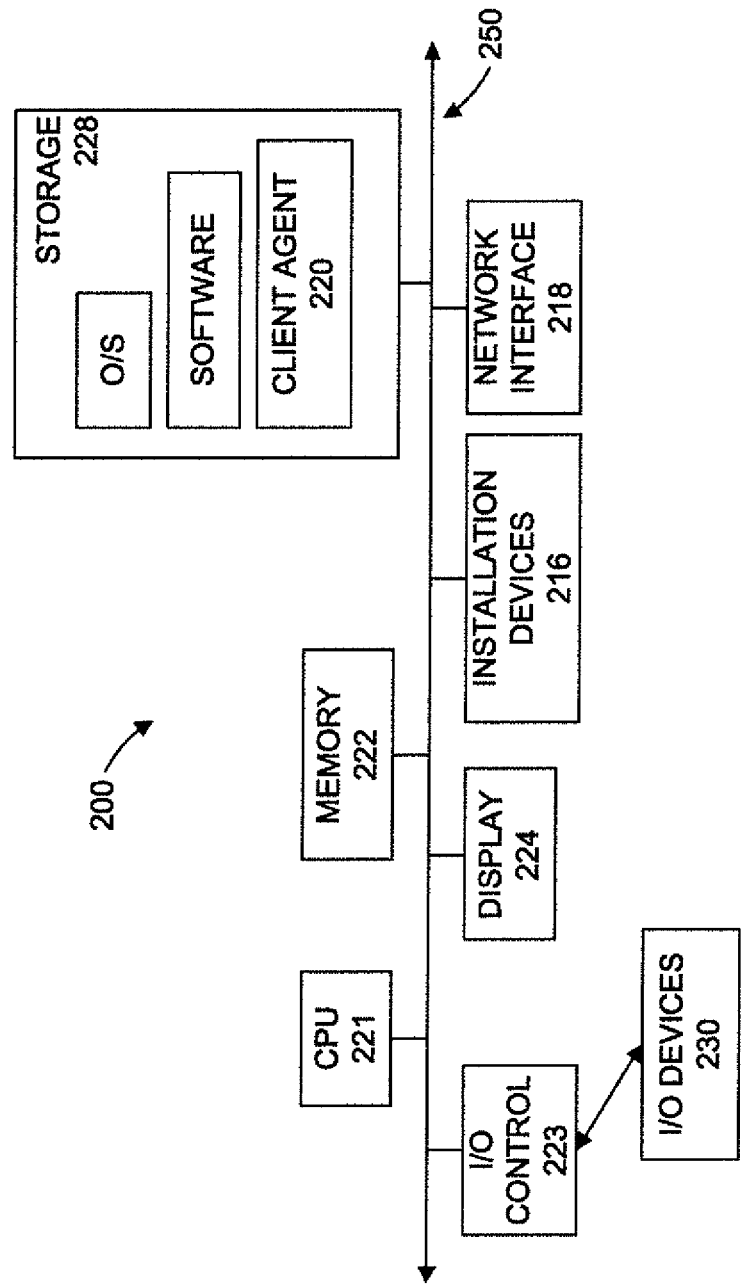
FIGS. 2A-2B are block diagrams of an example computing device, consistent with embodiments described herein.
Figure 2B:
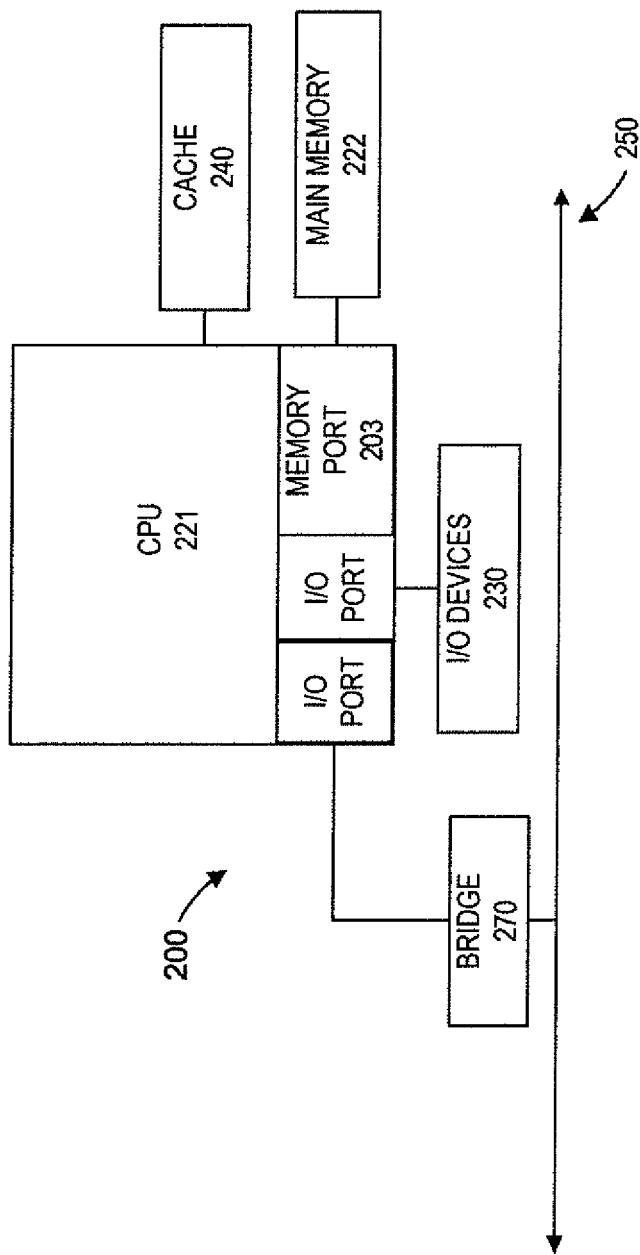

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash memory, a RAM, a cache, a register, or a semiconductor memory. Main memory 222 can be one or more memory chips capable of storing data and allowing any storage location to be accessed by CPU 221. Main memory 222 can be any type of random access memory (RAM), or any other available memory chip capable of operating as described herein. In the example embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. Furthermore, I/O device 230 can also provide storage and/or an installation medium for the computing device 200.

FIG. 2B depicts an embodiment of an example computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
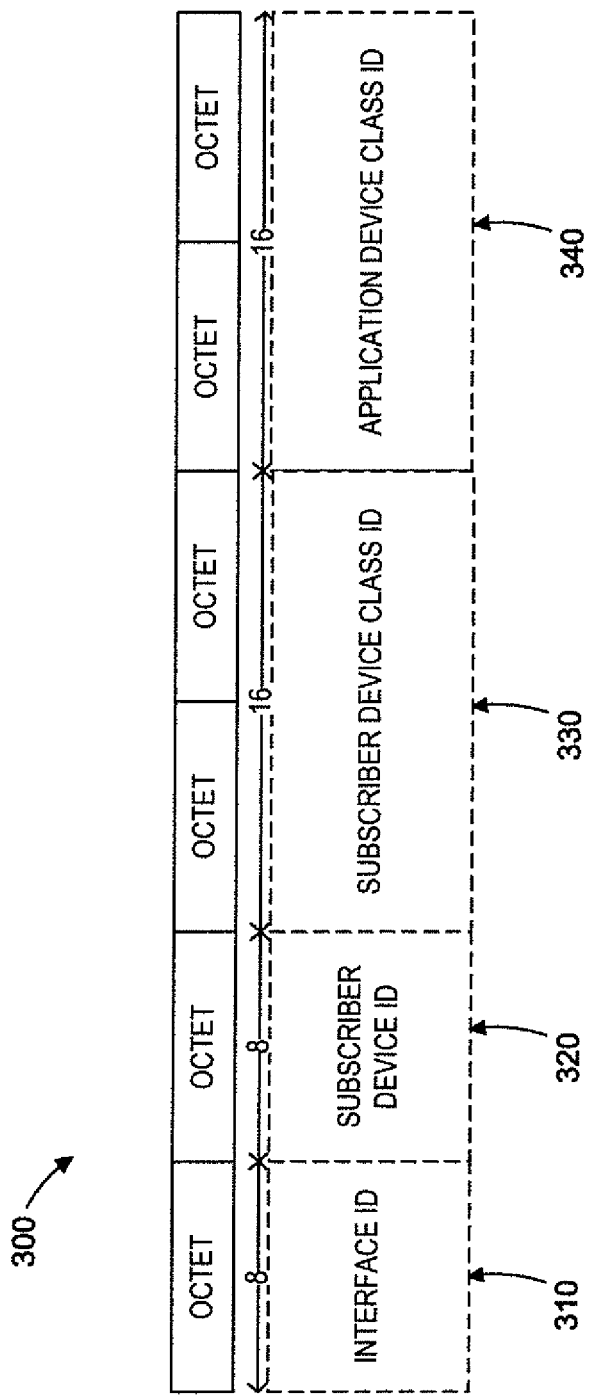
FIG. 3 is a diagram of an example control buffer, consistent with embodiments described herein.

FIG. 3 depicts a control buffer 300 used to encode messages for communicating classification information, consistent with the embodiments described herein. A control buffer 300 can be a field in a packet's data structure "struct sk_buff". A control buffer 300 can be an array that can be allocated to contain six eight bit values, where some or all of the values are based on criteria associated with a packet (e.g., subscriber data, application data, interface data, etc.). It should be understood that although an array is used herein when describing the structure of a control buffer, other data structures could be used to store values instead of an array.

References to the control buffer can be written using the notation cb[x], wherein x is a reference (or index) to a particular portion of the control buffer 300. The size of the fields in the control buffer 300, can be larger, smaller. The fields within control buffer 300 can also be arranged in a different order than shown. For instance, the portion of control buffer 300 containing an application device class ID 340 can be located before a subscriber device ID 320 in control buffer 300. It should also be noted that the bits in each field can be read from the least significant bit to the most significant bit. In some embodiments, the bits in each field can be read from the most significant bit to the least significant bit.

As shown in FIG. 3, control buffer 300 can be six octets long and divided into four different fields. The leftmost field in control buffer 300 can be an interface identifier (ID) 310. Interface ID 310 can hold a string of eight binary digits (bits) that can be used to uniquely identify a device to which the packet can be delivered. For instance, the packet can be delivered from a VLAN mux to either a wireless VLAN device or an Internet VLAN device based at least in part on a value stored in interface ID 310. As described above various portions of control buffer 300 can be represented by an array of values. Here, the interface ID 310 can be referenced using the notation cb[0].

The second to leftmost field in control buffer 300 can be a subscriber device ID 320. Subscriber device ID 320 can hold a string of eight binary digits (bits) that can be used to uniquely identify a subscriber device to which a packet can be delivered. For instance, a packet can be transmitted from a subscriber mux device to one of a plurality of subscriber devices. The subscriber device to which the packet is transmitted can be based upon a string of bits. As described above various portions of control buffer 300 can be represented by an array of values. Here, subscriber device ID 320 can be referenced using the notation cb[1].

The third to leftmost field in control buffer 300 can be a subscriber device class ID 330. Subscriber device class ID 330 can hold a string of sixteen binary digits (bits) that can be used to uniquely identify a class within a qdisc to store and/or shape a packet in a subscriber device. As described below, a string stored in subscriber device class ID 330 can be populated by a Classification kernel module. Moreover, a string stored in subscriber device class ID 330 can select a class associated with a leaf qdisc (thus, indirectly determining a qdisc) in which to store a packet within a subscriber device. As described above, various portions of control buffer 300 can be represented by an array of values. Here, subscriber device class ID 330 can be referenced by the notation cb[2, 3], and can contain a value such as 0x1234.

The rightmost field in control buffer 300 can be an application device class ID 340. Application device class ID 340 can hold a string of sixteen binary digits (bits) that can be used to uniquely identify a class within a qdisc to store and/or shape a packet in an application device. As described below, a string stored in application device class ID 340 can be populated by a Classification kernel module. Moreover, a string stored in application device class ID 340 can be used to determine a qdisc in which to store a packet within an application device. As described above various portions of control buffer 300 can be represented by an array of values. Here, application device class ID 340 can be referenced by the notation cb[4, 5], and can contain a value such as 0x5678.

Figure 4:
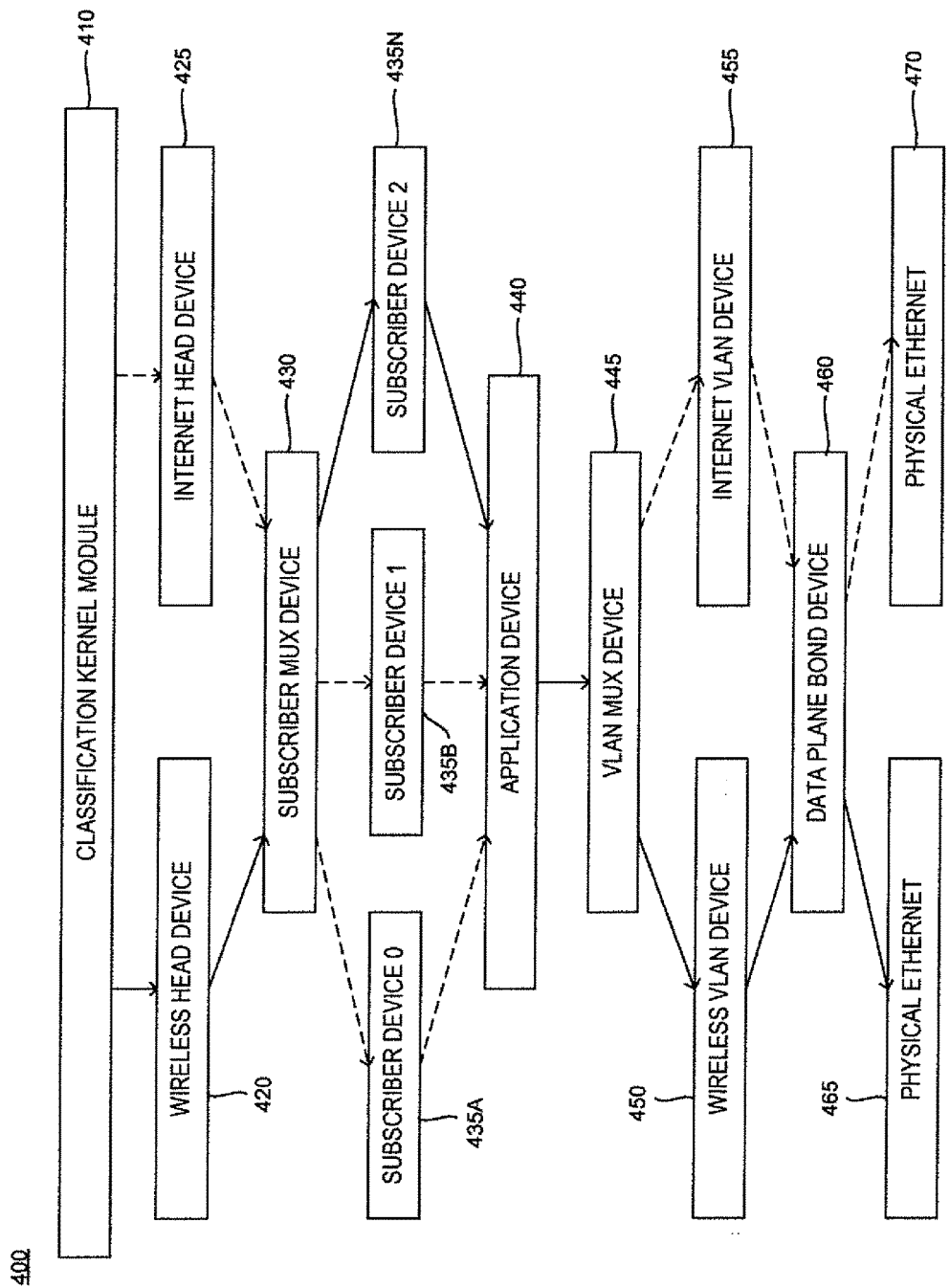
FIG. 4 is a block diagram of an example traffic shaping environment, consistent with the embodiments described herein.

FIG. 4 is a block diagram of an example traffic shaping environment 400, consistent with the embodiments described herein. It should be understood that while embodiments herein describe adding virtual devices for implementing additional traffic shaping to the application layer of an IP stack, embodiments can also be implemented in the transport layer or the Internet layer of an IP stack.

Traffic shaping environment 400 shown comprises all or some of: a Classification kernel module 410, a wireless head device 420, an Internet head device 425, a subscriber multiplexer (mux) device 430, one or more subscriber devices 435A-N (e.g., 435A, 435B, . . . , 435N), an application device 440, a VLAN mux device 445, a wireless VLAN device 450, an Internet VLAN device 455, a data plane bond device 460, and physical Ethernet 465, 470. A portion of the devices shown in traffic shaping environment 400 can be a portion of the standard Linux kernel, such as a Classification kernel module 410, a wireless VLAN device 450, an Internet VLAN device 455, and a data plane bond device 460. In addition, a portion of the devices shown in traffic shaping environment 400 can be virtual devices, including, but not limited to: wireless head device 420, Internet head device 425, subscriber mux device 430, subscriber devices 435A-N, application device 440, and VLAN mux device 445. It should be noted that in various embodiments described herein, a wireless VLAN device 450 or an Internet VLAN device 455 can be any arbitrary network devices, as long as there is a one to one relationship between the head devices (e.g., wireless head device 420 and/or Internet head device 425) and the network devices (e.g., wireless VLAN device 450 and Internet VLAN device 455). In some embodiments, it is appreciated that a data plane bond device 460 and physical Ethernet 465, 470 may not exist.

As briefly described above, a Classification kernel module 410 can determine at least a portion of a "route" that packets traverse through traffic shaping environment 400. In some embodiments, routing in an IP stack "above" Classification kernel module 410 can determine whether a packet is received at a wireless head device 420 or an Internet head device 425. As an example, a netfilter module can modify the head device (and thus the egress device) selected by an IP stack.

Classification kernel module 410 can determine the contents of a packet, and populate values into a portion of a control buffer 300. For instance, Classification kernel module 410 can populate subscriber device ID 320, subscriber device class ID 330, and application device class ID 340 based on criteria associated with a packet such as subscriber data and application data. As described above, the control buffer 300 can be a field in packets' struct sk_buff instances, and can be an array that can be allocated to contain six eight bit values.

As an example, the solid lines in traffic shaping environment 400 show a possible path that a packet can take while traversing the various devices. Note that herein, the term devices can refer to either physical devices and/or virtual devices. For instance, as described above, devices such as a Classification kernel module 410, a wireless VLAN device 450, and Internet VLAN device 455, and a data plane bond device 460 can be physical devices, while a wireless head device 420, an Internet head device 425, a subscriber mux device 430, subscriber devices 435A-N, an application device 440, and a VLAN mux device 445 can be virtual devices.

Further, in the example shown in traffic shaping environment 400, the dotted lines show possible paths that packets can use while traversing the various devices. The path that a particular packet takes is based at least in part on criteria associated with a packet, and thus is based at least in part on values stored in a packet's control buffer 300.

In this example, a packet enters a POSTROUTING hook of an IP stack and is handled by a Classification kernel module 410. The Classification kernel module 410 can register a callback function with an IP stack during its initialization. At this point, an IP stack routing code can determine the outbound device to be either wireless head device 420 or Internet head device 425. As an example shown in traffic shaping environment 400, a Classification kernel module 410 can queue a packet before it is received at wireless head device 420 or Internet head device 425 based at least in part on criteria associated with a packet, such as interface data. Herein, interface data can refer to data indicating whether traffic should be delivered to a wireless interface or an Internet interface (e.g., wired). Moreover, in some embodiments, a Classification kernel module 410 can look up a packet in an internal table and determine that a subscriber has been configured with at least two traffic shaping rules. For instance, the first rule can specify which subscriber device 435A-N to transmit a packet to, and that the packet should be shaped using an HTB qdisc class of the subscriber device 435A-N that the packet was transmitted to. A second rule can apply to an application device 440 and specify that the packet should be shaped using another HTB qdisc class.

After a packet is transmitted to a wireless head device 420 or an Internet head device 425, the interface ID 310 of a control buffer 300 associated with the packet can be populated by a wireless head device 420 or the Internet head device 425. For example, cb[0] can be populated with the value 0 by the wireless head device 420 such that a portion of a traffic shaping environment 400 (e.g., VLAN mux device 445) can subsequently transmit a packet to a wireless VLAN device 450. Similarly, for example, cb[0] can be populated by an Internet head device 425 with the value 1 such that a portion of a traffic shaping environment 400 (e.g., VLAN mux device 445) can subsequently transmit a packet to an Internet VLAN device 455.

In embodiments described herein, a routing code in an IP stack can determine an outbound device (e.g., a wireless VLAN device 450 or an Internet VLAN device 455), and a Classification kernel module 410 can retrieve information from the packet and an internal table, and determine that a subscriber has been configured with two traffic shaping rules, as an example. As shown in traffic shaping environment 400, the first rule can dictate that subscriber mux device 430 should queue the packet to subscriber device 435N, and that subscriber device 435N should shape the packet using an HTB qdisc class of subscriber device 435N. The second rule is for the application device 440 and specifies that the packet should be shaped using another HTB qdisc class of the single application device 440. Thus, in this example, the solid lines in traffic shaping environment 400 indicate that the control buffer contained values indicating that cb[1] contained the value 2 (for transmitting a packet from subscriber mux device 430 to subscriber device 435N), cb[2, 3] contained a value specifying a first class, and cb[3, 4] contained a value specifying a different class. In various embodiments described herein, only the lower 16 bits of a class ID need to be stored because by convention all root qdisc IDs would be assigned to qdisc ID 1.

Thus, by adding virtual devices such as a subscriber mux device 430, subscriber devices 435A-435N, and application device 440, it is possible to queue packets to more than 64K qdiscs. Of note, it is possible to add additional devices such as an application mux device and additional application devices in the same manner as the subscriber mux device 430 and subscriber devices 435A-N. Additional application devices can be added instead of, or in addition to, the additional subscriber devices 435A-N, and they can be located such that packets traversing traffic shaping environment 400 reach application devices prior to reaching subscriber devices.

To reiterate, regardless of whether a packet is sent from Classification kernel module 410 to a wireless head device 420 or an Internet head device 425, the packet can then be sent to a subscriber mux device 430. The subscriber mux device 430 can then transmit a packet to a specified subscriber device 435A-N. Although only three subscriber devices 435A-N are shown, fewer or more can be implemented in various embodiments. For example, some embodiments can contain 4, 8, 16, or more subscriber devices 435A-N.

When passing packets from a subscriber mux device 430 to a subscriber device 435A-N, an index to the control buffer 300 is retrieved. In this example, the value stored in cb[1] is retrieved, determined to be 2, and as such the packet is transmitted to subscriber device 435N.

In this example, when subscriber device 435N receives a packet, or any other subscriber device 435A-N, the subscriber device 435A-N retrieves an HTB class ID (e.g., subscriber device class ID 330) of the class that should shape the packet based at least in part on the values in cb[2, 3]. Recall that the values in cb[2, 3] can be populated by the Classification kernel module 410. After being shaped, the packet is transmitted to application device 440.

Application device 440 shapes a packet based on application data, as described above. For example, application device 440 can shape a packet based on whether the packet is associated with a video conference, an online video game, a BitTorrent, streaming video, email, remote desktop applications, a particular website or IP address, etc. Application device 440 can retrieve an HTB class ID (e.g., application device class ID 340) to shape traffic from cb[4, 5], which was set by the Classification kernel module 410.

Next, the application device 440 can transmit the packet to the VLAN mux device 445. In various embodiments, the VLAN mux device 445 (or, any of the virtual devices such as wireless head device 420 and/or Internet head device 425) can be a VLAN mux "insane" device. The term insane ("INterface SAmple for Network Errors") refers to modifications to a General Public License (GPL) Linux device driver that provides a skeleton for a virtual network interface driver, which can be modified to accomplish traffic control goals.

After receiving the packet at the VLAN mux device 445, the VLAN mux device 445 determines which device (e.g., network interface 218) to deliver the packet to from the value stored in cb[0] of control buffer 300, which was set by either the wireless head device 420 or the Internet head device 425. As shown in the example in traffic shaping environment 400, the value in cb[0] was set to 0, and the VLAN mux device 445 transmits the packet to wireless VLAN device 450.

Subsequent to the Wireless VLAN device 450 or the Internet VLAN device 455 receives the packet, the packet is tagged via the data plane bond device 460 and delivered to a currently active physical Ethernet interface (either physical Ethernet 465 or physical Ethernet 470, in this example) for transmission. For the purposes of brevity, submitting a packet from a data plane bond device 460 to physical Ethernet 465, 470 is known in the art, and will not be described in detail herein.

Again, it should be noted that the above description of how a packet travels through the described devices is an example, and that many variations can be implemented. For instance, there can be more than three subscriber devices 435A-N. As another example, the application device 440 could be associated with additional devices in the same manner as the subscriber mux device 430. It is further contemplated that in some embodiments, the application device 440 could be located above the subscriber mux device 430, such that packets are shaped by an application device 440 prior to being shaped by a subscriber mux device 430 or a subscriber device 435A-N.

Thus, by adding additional devices coupled to a subscriber mux device 430 (e.g., the subscriber devices 435A-N), the 64K qdisc limitation is overcome since the subscriber devices 435A-N, in combination (e.g., when combined) can store a number of qdiscs greater than 64K qdiscs. As such, packet flow can be limited by multiple independent criteria. As described above, a subscriber can have one of many plans providing them with a particular amount of bandwidth. Based at least in part on the amount of bandwidth associated with the subscriber, their packets can be shaped by one of the plurality of subscriber devices 435A-N. Further, an entity (e.g., a user, a corporation, etc.) can have a subscription plan providing different bandwidth rates based on the time of day, the destination of a particular packet, the source of a particular packet, the subnet to which a particular packet is being sent, etc. In addition, an application device 440 can also shape the packet after (or before) it has been shaped by a subscriber device 435A-N based at least in part on a type of traffic (e.g., application data) such as whether the traffic is associated with a video conference, a high definition video stream, a video game, email, a remote desktop application, etc. Thus, traffic can be shaped by multiple criteria such that the traffic shaping is performed in the aggregate, as opposed to being shaped, for instance, using a fifo_fast qdisc (First In First Out). As an example of traffic shaping based on an aggregation of criteria associated with a packet, an entity can experience higher latency if the entity is subscribed to an inexpensive subscription plan that throttles packets during peak bandwidth usage hours, and where traffic is further throttled because the entity is accessing and/or playing an online video game. Conversely, for example, an entity's traffic can experience less latency if the user has a higher priced subscription plan and is using a video conferencing application during non-peak hours.

Figure 5:
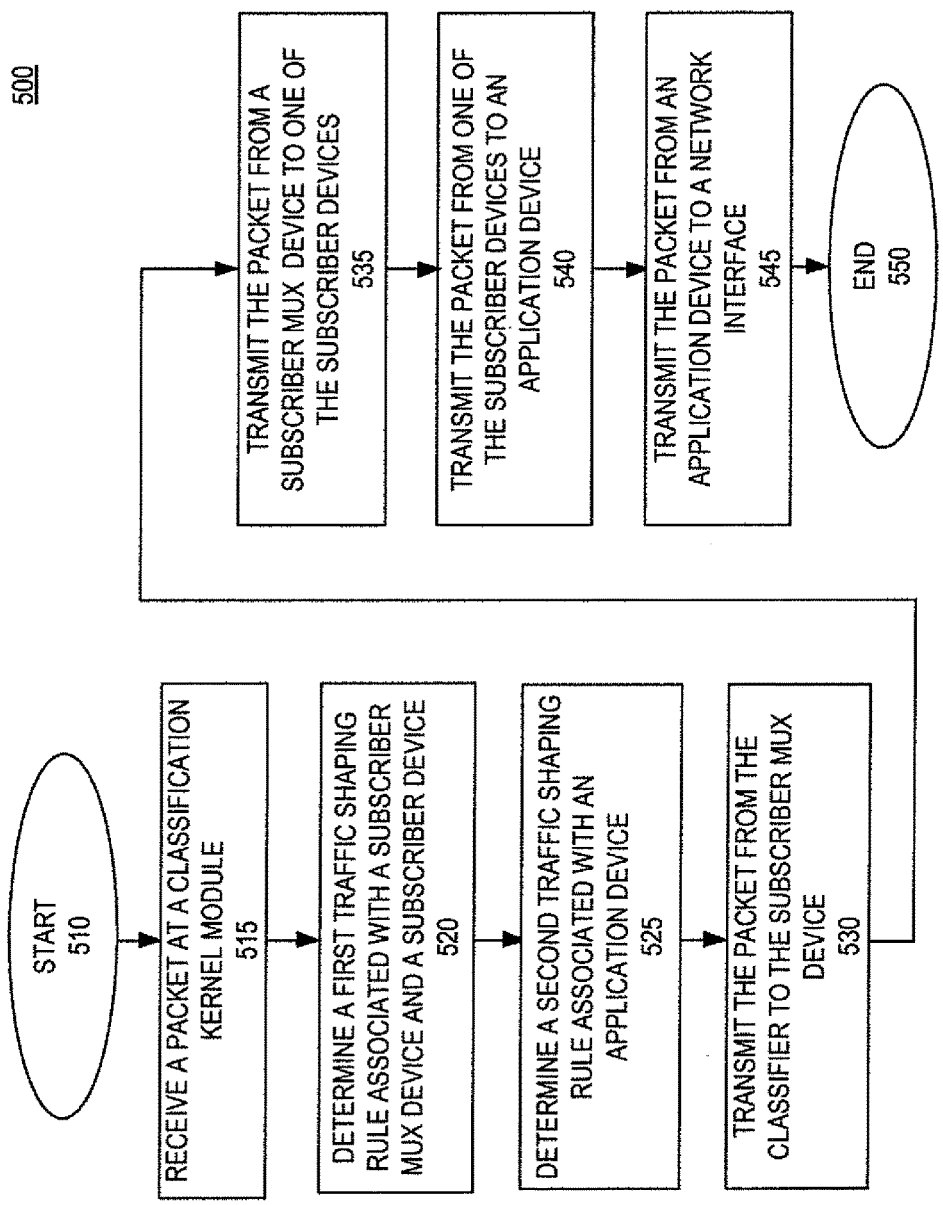
FIG. 5 is a flowchart representing an example method of shaping network traffic, consistent with embodiments described herein.

FIG. 5 is a flowchart representing an example method 500 for shaping network traffic, consistent with embodiments described herein. Referring to FIG. 5, it will readily be appreciated that the illustrated procedure can be altered to delete steps or further include additional steps, as described below. For instance, additional steps may occur between steps 540 and 545 (e.g., a packet may traverse a VLAN mux). Moreover, steps can be performed in a different order than shown in method 500, and/or in parallel. While the flowchart representing method 500 provides example steps for a device (e.g., servers 105A-C, appliance 108 or 108', etc.) to conduct traffic shaping, it is appreciated that one or more other devices may conduct the traffic shaping alone or in combination with the appliance (e.g., steps 440 and 445 can be performed by a single device instance).

Before initiating method 500, appliance device (e.g., servers 105A-C, appliance 108 or 108', etc.) can receive network traffic from devices in the network and analyze received packets of the network traffic. The analysis can include determining criteria (interchangeably referred to as characteristics or properties) associated with received packets, including, but not limited to: measuring the incoming flow of packets (e.g., number of packets per unit of time), the statistical distribution of packets arriving at an appliance associated with a particular application, the source IP address of the packets, the destination IP address of the packets, the source MAC address of the packets, the destination MAC address of the packets, applications associated with the packets, subscriber levels or other subscriber information associated with the packets, the inter-arrival times of packets across all applications, inter-arrival times of packets generated by certain devices (e.g., desktop computer, laptop computer, mobile phone, personal data assistant, tablet, etc.). Using this analysis, a Classification kernel module 410 can classify the received packets, based on the analysis of the traffic and any other information provided by an administrator, an appliance, or components of the appliance.

After initial start step 510, the appliance receives a packet at a Classification kernel module (e.g., Classification kernel module 410) at step 515. As described above, an IP stack can determine whether to send a packet to a wireless head device or an Internet head device. Further, a Classification kernel module can populate at least a portion of a control buffer, based at least upon traffic shaping rules (also referred to as "rules") associated with criteria associated with a packet.

At step 520, the appliance determines a first traffic shaping rule associated with a subscriber mux device (e.g., subscriber mux device 430) and a subscriber device. The first traffic shaping rule can be associated with values stored in a control buffer (e.g., values stored in subscriber device ID and subscriber device class ID). These values can be used to determine a particular subscriber device to transmit a packet to, and a particular class within the determined subscriber device to shape the packet.

The method continues to step 525 where a second traffic shaping rule associated with an application device (e.g., application device 440) is determined. The second traffic shaping rule can be associated with values provided in a control buffer 300 (e.g., values stored in application device class ID 340), and used to determine a particular class to store the packet within a qdisc within an application device.

The method continues to step 530 where a packet is transmitted from a Classification kernel module (e.g., Classification kernel module 410) to a subscriber mux device (e.g., subscriber mux device 430). As described above and in FIG. 4, there can be additional, or fewer devices coupled between a Classification kernel module and a subscriber mux device, such as a wireless head device or an Internet head device. In such a case, a packet can be transmitted from a Classification kernel module to a wireless head device or an Internet head device, and then transmitted to a subscriber mux device.

The method continues to step 535 where a packet can be transmitted from a subscriber mux device (e.g., subscriber mux device 430) to one of a plurality of subscriber devices (e.g., subscriber devices 435A-N). The subscriber device to which a packet is transmitted can be based upon a variety of criteria, such as a subscription level (e.g., a subscription plan corresponding to an entity where various levels comprise various benefits such as additional bandwidth), the subscriber (e.g., an entity such as a user, home, or corporation), etc. These criteria can be represented by one or more values stored in control buffer, as described above.

The method continues to step 540 where a packet is transmitted from a subscriber device (e.g., subscriber device 435A-N) to an application device (e.g., application device 440). The application device can contain at least one qdisc and queue the packet.

The method continues to step 545 where a packet is transmitted from an application device (e.g., application device 440) to a network interface (e.g., wireless VLAN device 450 or Internet VLAN device 455). Which network interface device is selected can be based at least in part on a value in a control buffer, such as the value in the leftmost field of a control buffer (e.g., cb[0] or an interface ID). This value can be populated by a wireless head device 420 or an Internet head device. After transmitting a packet to a network interface, or to a physical Ethernet, the method 500 can end at step 550.

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, DVD-ROM (digital versatile disk-read only memory), a DVD RAM (digital versatile disk-random access memory), flash memory, a RAM, a cache, one or more registers, or a semiconductor memory. Alternatively, the methods can be implemented in hardware components or combinations of hardware and software of a data processing apparatus, e.g. a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Example embodiments have been described herein with reference to numerous specific details that can vary from implementation to implementation. Certain adaptations and modifications of the example embodiments can be made. Other embodiments can be apparent to those skilled in the art from consideration of the specification. It is intended that the specification and examples be considered as examples only. It is also intended that the sequence of steps shown in figures are only for illustrative purposes and are not intended to be limited to any particular sequence of steps. As such, those skilled in the art can appreciate that these steps can be performed in a different order while implementing the same method.

That which is claimed is:

1. A computer network appliance comprising:
   a memory and a processor cooperating with the memory to run
      a classification kernel module performing traffic shaping on data packets based upon a first set of queuing disciplines (qdiscs), and
      at least one virtual device also performing traffic shaping on the data packets based upon a second set of qdiscs different than the first set of qdiscs, and providing the data packets to a network interface.

2. The computer network appliance of claim 1 wherein the classification kernel module further determines at least one traffic shaping rule associated with different data packets, and wherein the at least one virtual device selects respective qdiscs from among the second set of qdiscs for different data packets based upon the at least one traffic shaping rule determined by the classification kernel module.

3. The computer network appliance of claim 2 wherein the at least one traffic shaping rule comprises at least one of a subscriber traffic shaping rule and an application traffic shaping rule.

4. The computer network appliance of claim 1 wherein the at least one virtual device comprises at least one virtual subscriber device to perform traffic shaping based upon respective subscribers associated with the data packets.

5. The computer network appliance of claim 4 wherein the at least one virtual subscriber devices comprises a plurality of virtual subscriber devices; and wherein the processor further runs a virtual subscriber multiplexer (mux) device for distributing the data packets from the classification kernel module to the plurality of virtual subscriber devices.

6. The computer network appliance of claim 1 wherein the at least one virtual device comprises a virtual application device to perform traffic shaping based upon a data type associated with the data packets from among a plurality of different data types.

7. The computer network appliance of claim 1 wherein the network interface comprises a wireless virtual local area network (VLAN) and an Internet VLAN; and wherein the processor further runs a virtual wireless head to receive data packets from the classification kernel module designated for the wireless VLAN device, and an Internet head to receive data packets from the classification kernel designated for the Internet VLAN.

8. The computer network appliance of claim 7 wherein the processor further runs a VLAN multiplexer (mux) to route data packets to the wireless VLAN or Internet VLAN based upon the virtual wireless head and the virtual Internet head.

9. A computer network traffic shaping method comprising:
   performing traffic shaping on data packets at a classification kernel module based upon a first set of queuing disciplines (qdiscs);
   performing traffic shaping on the data packets also using at least one virtual device based upon a second set of qdiscs different than the first set of qdiscs; and
   providing the data packets to a network interface after traffic shaping based upon the first and second sets of qdiscs.

10. The method of claim 9 further comprising:
    determining at least one traffic shaping rule associated with different data packets at the classification kernel module; and
    selecting respective qdiscs from among the second set of qdiscs for different data packets at the at least one virtual device based upon the at least one traffic shaping rule determined by the classification kernel module.

11. The method of claim 10 wherein the at least one traffic shaping rule comprises at least one of a subscriber traffic shaping rule and an application traffic shaping rule.

12. The method of claim 9 wherein the at least one virtual device comprises at least one virtual subscriber device to perform traffic shaping based upon respective subscribers associated with the data packets.

13. The method of claim 12 wherein the at least one virtual subscriber device comprises a plurality of virtual subscriber devices; and further comprising distributing the data packets from the classification kernel module to the plurality of virtual subscriber devices using a virtual subscriber multiplexer (mux) device.

14. The method of claim 9 wherein the at least one virtual device comprises a virtual application device to perform traffic shaping based upon a data type associated with the data packets from among a plurality of different data types.

15. A non-transitory computer-readable medium for a computer network appliance running a classification kernel module and at least one virtual device, the non-transitory computer-readable medium having computer-executable instructions for causing the computer network appliance to perform steps comprising:
    performing traffic shaping on data packets at the classification kernel module based upon a first set of queuing disciplines (qdiscs);
    performing traffic shaping on the data packets also using the at least one virtual device based upon a second set of qdiscs different than the first set of qdiscs; and
    providing the data packets to a network interface after traffic shaping based upon the first and second sets of qdiscs.

16. The non-transitory computer-readable medium of claim 15 further having computer-executable instructions for causing the computer network appliance to perform steps comprising:
    determining at least one traffic shaping rule associated with different data packets at the classification kernel module; and
    selecting respective qdiscs from among the second set of qdiscs for different data packets at the at least one virtual device based upon the at least one traffic shaping rule determined by the classification kernel module.

17. The non-transitory computer-readable medium of claim 16 wherein the at least one traffic shaping rule comprises at least one of a subscriber traffic shaping rule and an application traffic shaping rule.

18. The non-transitory computer-readable medium of claim 15 wherein the at least one virtual device comprises at least one virtual subscriber device to perform traffic shaping based upon respective subscribers associated with the data packets.

19. The non-transitory computer-readable medium of claim 18 wherein the at least one virtual subscriber device comprises a plurality of virtual subscriber devices; and further having computer-executable instructions for causing the computer network appliance to run a virtual subscriber multiplexer (mux) device to distribute the data packets from the classification kernel module to the plurality of virtual subscriber devices.

20. The non-transitory computer-readable medium of claim 15 wherein the at least one virtual device comprises a virtual application device to perform traffic shaping based upon a data type associated with the data packets from among a plurality of different data types.

* * * * *